United States Patent Office 2,938,997
Patented May 31, 1960

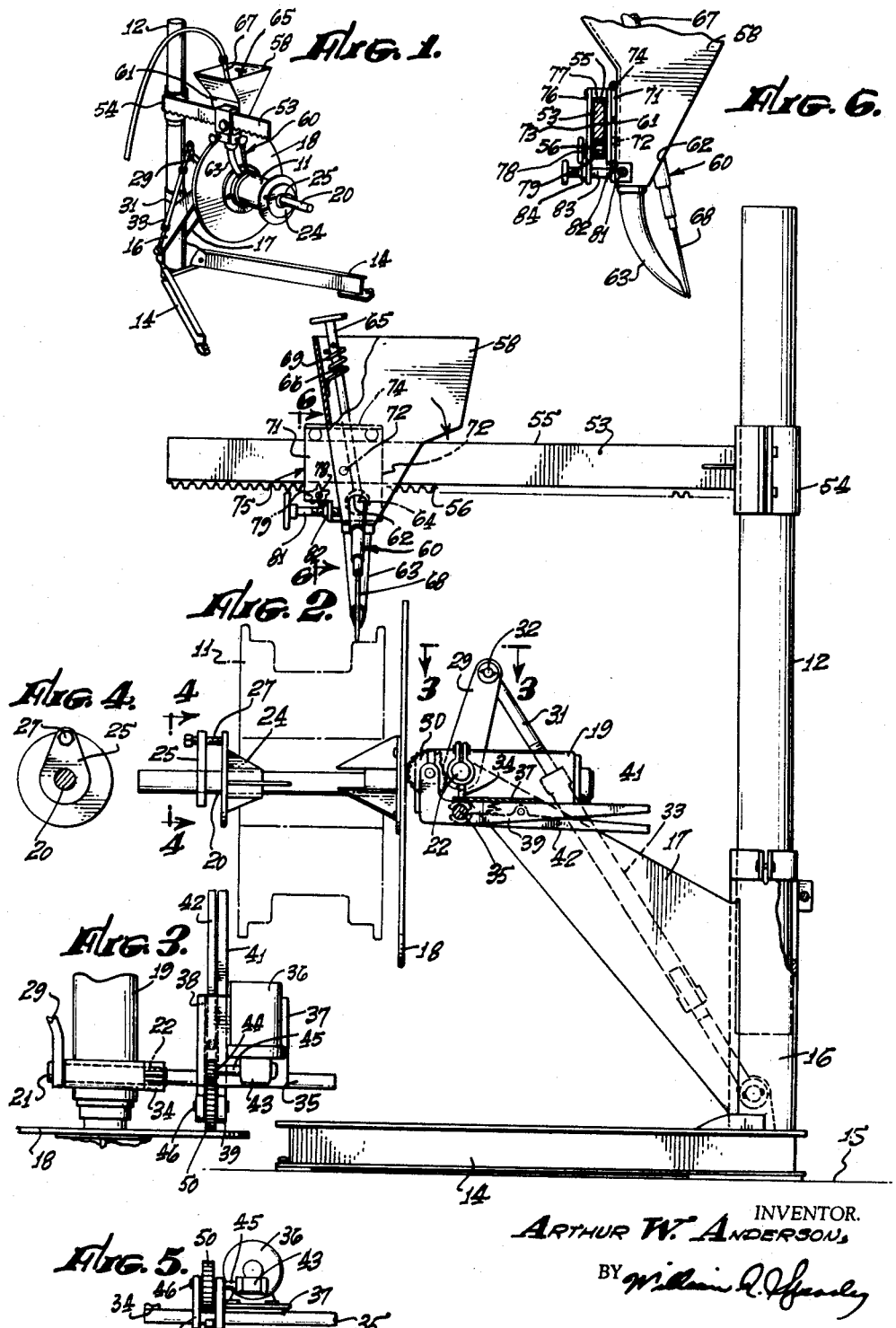

2,938,997

WELDING DEVICE

Arthur W. Anderson, 423 Bedford St., La Habra, Calif.

Filed Aug. 15, 1957, Ser. No. 678,382

1 Claim. (Cl. 219—124)

This invention relates to welding devices, and more particularly to an apparatus for applying weld metal on circumferential surfaces.

In reconditioning and rebuilding metal wheels and devices, such as tractor rollers and idlers, a layer of weld metal is deposited upon worn or damaged surfaces of the device. That is, the surfaces of the roller or idler will be worn in use and a substantial portion of the original contact surface will be removed. In order to rebuild the roller or idler a substantial layer of weld metal is built up on the various circumferential surfaces such as the driving surface, rims, and flanges to return the roller or idler to its original configuration. In the deposition of such large quantities of weld metal it is necessary that the weld metal should be quickly and uniformly deposited upon all of the circumferential surfaces.

It is an object of the present invention to provide a welding apparatus for placing weld metal upon circumferential surfaces at a uniform rate of deposition.

It is another object of the present invention to provide a welding apparatus wherein the welding angle with respect to a circumferential surface may be varied and maintained constant.

It is another object of the present invention to provide a welding machine for depositing weld metal upon circumferential surfaces which are in various planes.

It is a further object of the present invention to provide such a welding apparatus in which the flow of welding flux may be accurately controlled.

A still further object of the present invention is to provide a welding apparatus for building up layers of weld metal upon circular objects having various diameters and external configurations.

The present invention is a welding apparatus for depositing weld metal on an object having circumferential surfaces and comprises a rotatable spindle with means for mounting the object on the spindle perpendicular thereto. The spindle is pivotable about a transverse axis to change the axis of rotation of the object and spindle. Means are provided for rotating the spindle at a constant rate which may be changed by changing the radius of drive between a friction driving wheel and a driven plate with which the spindle rotates. The apparatus includes means for feeding welding rod and welding flux to a position proximate the circumferential surface of the object. The weld feeding means is movable transverse to the circumferential surface. In addition, the welding angle at which the welding rod approaches the circumferential surface, and the angle of the rod in the transverse plane are variable.

The novel features which are believed to be characteristics of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and example only, and is not intended as a definition of the limits of the invention.

Figure 1 is a view in perspective of the presently preferred embodiment of the welding apparatus;

Figure 2 is a side view in elevation of the apparatus of Figure 1;

Figure 3 is a partial plan view;

Figure 4 is a view taken along line 4—4 of Figure 2;

Figure 5 is a view in elevation of the drive mechanism of the present invention; and Figure 6 is a view taken along line 6—6 of Figure 2.

Referring now to the figures, and particularly to Figures 1 and 2, the wheel or other device upon which weld metal is to be deposited is shown to be a roller 11 for purposes of illustration. The presently preferred embodiment of the present invention comprises a support means which includes a vertical support post 12 affixed to support legs 14 which are in turn affixed to the floor or supporting surface 15. A support boom 16 is affixed to the post 12 and extends outwardly from the post for a substantial distance. In order to allow the spindle to be tilted as described hereinafter, the boom 16 extends upwardly and outwardly from the post and forms a shaft mounting bearing proximate the outer end thereof.

A spindle head or bearing 19 is rotatably mounted to one side of the boom 16 for rotary motion in the substantially vertical plane. The spindle bearing is of the type well known to the art which comprises a combination rotary and thrust bearing for the mounting of a spindle shaft. Shafts 21 and 22 are affixed to the bearing assembly 19 and extend horizontally from opposed sides of the bearing housing. The shaft is mounted within bearings in the boom 16 to obtain the necessary rotatable mounting of the bearing assembly 19. A spindle 20 is rotatably mounted in the bearing assembly 19 extending therefrom to provide a mounting means for the roller 11. The spindle is thus freely rotatable within the bearing 19 but is restrained from any axial movement with respect to the bearing.

A driven plate 18 is affixed to the spindle 20 substantially adjacent the outward end of the bearing assembly 19. The plate 18 is substantially rigid and rotates with the spindle 20. Mounted upon the spindle are a pair of telescoping conical supports which furnish an adjustable mounting means for the roller 11 upon the spindle. That is, a fixed support cone 23 is affixed to the spindle and the plate 18 adjacent the outer side of the plate. The second cone support 24 is slidably mounted upon the spindle for sliding movement toward and away from the fixed cones. The cones are, for example, formed of three triangular plates as shown in Figure 2 which are radially spaced about the spindle with the apices of the cones extending toward each other. Thus, by varying the position of the movable cone an idler or other object of any thickness or inside diameter can be mounted. As shown in Figs. 2 and 4 a fixing clamp 25 is slidably mounted upon the spindle outwardly of the movable cone. A pressure screw 27 extends threadably through the clamp 25 into contact with the movable cone. Thus, after the roller 11 is mounted upon the cones the clamp is set proximate the cone 24 and the pressure screw 27 is turned inward to bend the clamp upon the spindle and fix the cone 24 under pressure to rigidly mount the roller 11 upon the spindle to rotate therewith.

Angular adjustment of the spindle and bearing assembly is provided by a lever arm 29 which is fixed to the shaft 21 to the side of the boom 16 opposed to the bearing 19. Referring now to Figs. 1, 2 and 3, an adjusting arm 31 of variable length is rotatably fixed at the outer end 32 of the lever arm 29 and at a fixed point on the support post 12. Variation of the length of the adjusting arm is obtained by means of a turnbuckle arrangement 33 or other means well known to the art. Thus, the length of the adjusting arm 31 can be varied to pivot the lever arm 29 and the shaft 21 to which it is affixed. Pivoting of the shaft will in turn cause the spindle and bearing assembly to be rotated with respect to the boom 16 to change the angle at which the spindle is mounted and the corresponding angle of rotation of the roller 11.

Referring now to Figs. 2, 3 and 5, the spindle driving means is shown. A mounting shaft 35 extends from the bearing housing parallel to the plane of the plate 18 and substantially parallel to a diameter of the plate. The mounting shaft is affixed to the shaft 22 by means of a bracket 34 which is clamped or welded between the shafts. A driving motor 36 is mounted upon a semi-rigid base 37 which is slidably and rotatably affixed to the shaft 35. The motor base 37 is rotatably affixed to the shaft with the center of gravity of the motor 36 positioned to the side of the shaft, away from the plate 18. Rotatable sliding movement of the motor base 37 upon the shaft is obtained in this embodiment by affixing the base 37 upon a first horizontally extending bracket 38 and a second horizontally extending bracket 39. The brackets 38 and 39 have openings through which the shaft 35 passes beneath the motor base 37. The first bracket 38 is positioned proximate the inner edge of the base 37 and extends substantially perpendicularly to the shaft 35 toward the plate 18. The second bracket 39 extends parallel to the first bracket 38 and spaced therefrom. In addition, the second bracket extends beyond the motor base 37 to form a hand grip or handle 41. Positioned proximate the handle 41 is a scissoring lever 42 which is spring loaded to close a split clamp upon the shaft 35 between the brackets 38 and 39. The split clamp is of the spring loaded type well known to the art and is normally urged to the closed position. Thus, to move the motor base and driving assembly along the shaft 35, the clamp is released by gripping the handle 41 and lever 42 to disengage the clamp. The motor 36 is connected to a gear reducing unit 43 of the type well known to the art. A first driving gear 44 is affixed to the driving shaft 45 of the gear reducer 43 to provide a low speed driving means. Rotation of the driving shaft 45 is transmitted through the first gear 44 to a friction driving gear 50 which is rotatably mounted upon a shaft 46 which is affixed between the brackets 38 and 39 proximate the surface of the driving plate and parallel thereto. The driving gear 50 and first gear 44 are at a fixed distance from each other and are maintained in mesh. The driving gear 50 is in friction contact with the plate 18 during operation of the apparatus. The disengaging lever arm 42 allows manual rotation of the driving assembly about the shaft 35 to disengage the driving gear 50 from the plate 18. The diameter and speed of rotation of the driving gears may be determined by one skilled in the art for optimum conditions in view of the foregoing and following description of operation. The driving gear 50, however, is so oriented that it is in friction contact with the plate 18 substantially along a diameter of the plate and rotates in a plane substantially perpendicular to the diameter to minimize any slipping contact with the plate 18. Since the position of the driving assembly, and particularly the driving gear or wheel 50 can be varied along the shaft 35, the rate of rotation of the plate 18 and spindle 20 can be varied although the rate of rotation of the driving means remains constant. That is, when the driving wheel 50 is positioned toward the center of rotation of the plate 18, the plate and spindle will rotate at a greater speed than that obtained when the driving wheel is positioned near the circumference of the plate.

Positioned above the spindle assembly is a horizontal support arm 53 which is affixed to the support post 12 by means of a movable clamp 54. Referring now to Figs. 1, 2 and 6, the support arm 53 is substantially rectangular in configuration with an upper bearing surface 55 and a continuous rack 56 of gear teeth on the lower surface. The flux hopper 58 and welding rod feed subassembly 60 is mounted upon the support arm for horizontal movement along the support in a plane substantially parallel to the axis of rotation of the spindle. The flux hopper 58 may be of any desired configuration but in this embodiment is generally conical with a substantially vertical mounting face 61 and a flux outlet 62 to which an outlet nozzle 63 is attached. A flow regulating ball 64 is mounted within the hopper and is of sufficient size to close or partially close the flux outlet 62. The ball 64 is affixed to an adjusting rod 65 which is threadably mounted to a wall of the hopper for movement of the ball toward or away from the outlet 62 to regulate the flow of flux. In this embodiment the threadable mounting is obtained by positioning the rod 65 within a helical coil 69 which is affixed to the hopper wall. Pins 66 affixed to the rod extend between turns of the coil such that manual rotation of the rod causes the ball to be moved toward and away from the flux outlet.

A guide tube 67 extends through the hopper from the exterior thereof and outward from the hopper through a wall of the hopper to position the tip of the welding rod 68 proximate the end of the flux nozzle 63. Both the flux nozzle outlet and the tip of the welding rod are positioned proximate a vertical plane extending through the axis of the spindle with the welding rod 68 being downwardly and forwardly inclined with respect to the axis as shown in Fig. 6. The guide tube 67 is connected to an arc welding machine such as a semi-automatic arc welder (not shown) of the type well known to the art.

The hopper 58 is carried upon the support arm 53 in such manner as to be variable in two directions to vary the angle at which the welding rod approaches the idler 11. A hinged plate 71 is pivotally affixed to the flat face 61 of the hopper by means of a pivot pin 72. That is, the hopper is supported by the pivot pin 72 and is maintained in contact with the plate 71 thereby. The hinged plate is in turn mounted to a side plate 73 by means of a hinge 74. The side plate 74 forms one side of a bracket 75 for supporting the hopper upon the arm 53 and moving it along the arm substantially parallel to the spindle. The bracket comprises the side plate 73 and a second side plate 76 which are spaced apart, and connected by, the bearing plate 77 which is in sliding contact with the bearing surface 55 of the support arm, or in rolling contact through rollers 52. An operating shaft 78 is rotatably mounted through the second side plate 76 with a pinion 79 upon the shaft in mating engagement with the rack 56 on the lower surface of the support arm 53. By manually rotating the shaft 78 the hopper subassembly 60 is moved in either direction along the support arm and thus across the rotating face of the idler 11. Tilt adjustment of the hopper and welding rod is obtained by means of an adjusting shaft 81 which is threadably connected through a bushing 82 which is in turn affixed to the side plate 73 of the support bracket 75. The adjusting shaft is substantially parallel to the plane of the hinged plate 71 and is in bearing contact with the hopper beneath the pivot pin 72. Thus, by turning the adjusting shaft the hopper 58 is pivoted about the pivot pin 72. Similarly, a welding angle adjustment is obtained by means of an angle adjusting shaft 83 which is threadably connected through a bushing 84, which is in turn affixed to the second side plate 76. The adjusting shaft is in bearing contact with the hinged plate 71 and substantially perpendicular thereto. Thus, by rotating the angle adjusting shaft 83 the hopper and welding rod are rotated about the hinge 74 to vary the angle of approach of the welding rod to the surface of the idler 11.

Accordingly, in operation idler or other device to be welded is mounted upon the spindle 20 by varying the position of the movable cone 24 to accommodate the width and inside diameter of the device upon circumferential surface of which the weld metal is being deposited. The device is then fixed by means of the clamp 25. The rate of rotation of the idler, and thus the welding travel speed, is adjusted by moving the friction driving wheel 50 out of contact with the plate 18 by means of the disengaging lever 42. The drive subassembly is then moved along the support shaft 35 to position the friction drive wheel 50 at the radius of the plate 18 which will thus cause the plate and spindle to be rotated at the desired rate by the constant speed motor 36 and reducing gear 43. The disengaging lever is released after the drive assembly has been rotated about the shaft 35 to bring the driving wheel into friction contact with the plate. If the device upon which weld metal is being deposited has a surface which is not parallel to the spindle, or if it is necessary for other reasons, the angle of the axis of the spindle with the horizontal is varied. Thus, the surface beneath the welding rod can be maintained horizontal. When the radius of the surface being welded changes considerably, the position of the support arm 53 is varied along the support post 12 to position the tip of the welding rod at the proper location. As discussed hereinbefore, the adjusting shaft 83 is rotated to select the desired angle at which the welding rod approaches the surface to be welded and the adjusting shaft 81 is rotated to tilt the welding rod in the plane of the axis of rotation. By tilting the welding rod weld metal is easily and uniformly deposited in corners of intersecting planes of the surface upon which the metal is being deposited. After the correct adjustments have been made the motor 36 and semi-automatic arc welder are turned on and the deposition of weld metal proceeds substantially automatically.

Thus, the present invention provides a welding apparatus for placing weld metal upon circumferential surfaces at a uniform rate of deposition. In depositing the weld metal the apparatus can be varied to accommodate various planes of the circumferential surface and the welding angle and flow of flux can be accurately controlled.

What is claimed is:

An apparatus for depositing weld metal on the circumferential surfaces of an object comprising: a rotatable spindle, means for mounting said object on said spindle substantially perpendicular thereto, means for pivoting said spindle about an axis perpendicular to said spindle to change the position of the axis of rotation of said object; a driving plate affixed to said spindle substantially perpendicular thereto; friction driving means in contact with said plate for driving said plate and spindle, said driving means including a friction driving wheel in driving contact with said plate; a motor connected to said driving wheel; a shaft mounted stationary with respect to said plate and lying in a plane substantially parallel to said plate, said motor and wheel being slidably mounted upon said shaft whereby the radius of said plate at which said wheel is in driving contact may be varied to vary the rate of rotation; means for feeding welding flux and welding rod to said rotating object, said feeding means positioned proximate the circumferential surface of said object, said feeding means including a flux hopper and a welding rod extending therefrom, said flux hopper having a substantially planar side; a first plate in bearing contact with said planar side and pivotally connected thereto for pivotal movement parallel to said planar side; a second plate hingedly affixed to said first plate for pivotal movement in the plane transverse to said planar side; a support arm extending substantially horizontally above said object; means for mounting said second plate upon said support arm for longitudinal movement with respect thereto; means for pivoting said hopper with respect to said first plate; means for pivoting said first plate with respect to said second plate; and means for moving said second plate and hopper along said support arm.

References Cited in the file of this patent

UNITED STATES PATENTS

| 1,440,536 | Gill | Jan. 2, 1923 |
| 1,550,651 | Charter | Aug. 18, 1925 |
| 2,680,182 | Chambers | June 1, 1954 |
| 2,709,213 | Gibson | May 24, 1955 |
| 2,745,935 | Powley | May 15, 1956 |
| 2,770,976 | Franz | Nov. 20, 1956 |
| 2,799,085 | Baker et al. | July 16, 1957 |